United States Patent [19]
Andersen

[11] Patent Number: 5,410,517
[45] Date of Patent: Apr. 25, 1995

[54] METHOD FOR CASCADING SWEEPS FOR A SEISMIC VIBRATOR

[75] Inventor: Kenneth D. Andersen, Kingwood, Tex.

[73] Assignee: Exxon Production Research Company, Houston, Tex.

[21] Appl. No.: 242,751

[22] Filed: Jun. 13, 1994

[51] Int. Cl.$^6$ ............................................. G01V 1/00
[52] U.S. Cl. ........................................ 367/75; 367/190; 367/38; 367/40; 367/41; 181/108; 181/113
[58] Field of Search .................... 367/189, 190, 40, 41, 367/37, 38; 181/113, 108

[56] References Cited

U.S. PATENT DOCUMENTS

| | | | |
|---|---|---|---|
| 3,886,493 | 5/1975 | Farr | 340/15.5 TD |
| 4,004,267 | 1/1977 | Mayne | 340/15.5 TD |
| 4,204,278 | 5/1980 | Nelson | 367/39 |
| 4,339,810 | 7/1982 | Nichols et al. | 367/49 |
| 4,493,067 | 1/1985 | Thomas et al. | 367/189 |
| 4,512,001 | 4/1985 | Mayne et al. | 367/189 |
| 4,598,392 | 7/1986 | Pann | 367/32 |
| 4,680,741 | 7/1987 | Wales et al. | 367/189 |
| 4,686,654 | 8/1987 | Savit | 367/41 |
| 4,766,576 | 8/1988 | Sallas et al. | 367/189 |
| 4,768,174 | 8/1988 | Castle | 367/39 |
| 4,780,856 | 10/1988 | Becquey | 367/23 |
| 4,823,326 | 4/1989 | Ward | 367/41 |
| 5,347,494 | 9/1994 | Andersen | 367/42 |

OTHER PUBLICATIONS

Kirk, P., "Vibroseis Processing," Chapter 2 of *Developments in Geophysical Exploration Methods*-2, edited by A. Fitch, Applied Science Publishers Ltd., London, 1981, pp,. 37–52.

Sorkin, S., "A Method for Reducing the Effects of Base Plate Distortion," presented at the 1972 Pacific Coast joint meeting of the Society of Exploration Geophysicists and the American Association of Petroleum Geologists, Bakersfield, Calif., Mar. 9 and 10, 1972.

Rietsch, E., "Reduction in Harmonic Distortion in Vibratory Source Records," *Geophysical Prospecting*, V. 29, pp. 178–188, 1981.

Edelmann, H. A. K. and Werner, H., "Combined Sweep Signals for Correlation Noise Suppression," *Geophysical Prospecting*, v. 30, pp. 786–812, 1982.

Ward, R. M., Brune, R. H., Ross, A., and Kumamoto, L. H., "Phase Encoding of Vibroseis Signals for Simultaneous Multisource Acquisition," presented at the Sixtieth Annual International Meeting & Exposition of the Society of Exploration Geophysicists, San Francisco, Calif., Sep. 23–27, 1990.

*Primary Examiner*—J. Woodrow Eldred
*Attorney, Agent, or Firm*—Keith A. Bell

[57] ABSTRACT

A method for cascading or linking seismic vibrator sweeps to form a cascaded sweep sequence. According to the method, a first cascaded sweep sequence is generated containing N sweep segments linked end-to-end. The N sweep segments are substantially identical, except that the initial phase angle of each sweep segment within the sweep sequence is progressively rotated by a constant phase increment of about 360/N degrees. A second cascaded sweep sequence is generated consisting of (i) N consecutive sweep segments linked end-to-end which correspond to said first cascaded sweep sequence and (ii) an additional sweep segment linked to the N consecutive sweep segments which is positioned and phased so as to substantially suppress harmonic ghosts during correlation. One of these cascaded sweep sequences is used for the vibrator sweep sequence and the other is used for the correlation reference sequence. Any type of sweeps may be cascaded or linked according to the method, and any amount of padding (listen time) may be inserted between the individual sweep segments.

28 Claims, 5 Drawing Sheets

METHOD FOR CASCADING SWEEPS FOR A SEISMIC VIBRATOR

FIELD OF THE INVENTION

This invention relates to the field of geophysical prospecting and, more particularly, to a method for generating seismic vibrator data using cascaded sweeps.

BACKGROUND OF THE INVENTION

In the oil and gas industry, geophysical prospecting techniques are commonly used to aid in the search for and evaluation of subterranean hydrocarbon deposits. Generally, a seismic energy source is used to generate a seismic signal which propagates into the earth and is at least partially reflected by subsurface seismic reflectors (i.e., interfaces between underground formations having different acoustic impedances). The reflections are recorded by seismic detectors located at or near the surface of the earth, in a body of water, or at known depths in boreholes, and the resulting seismic data may be processed to yield information relating to the location of the subsurface reflectors and the physical properties of the subsurface formations.

One type of geophysical prospecting utilizes an impulsive energy source, such as dynamite or a marine air gun, to generate the seismic signal. With an impulsive energy source, a large amount of energy is injected into the earth in a very short period of time. Accordingly, the resulting data generally have a relatively high signal-to-noise ratio, which facilitates subsequent data processing operations. On the other hand, use of an impulsive energy source can pose certain safety and environmental concerns.

In the late 1950s and early 1960s, Conoco Inc. pioneered development of a new type of geophysical prospecting, generally known as "vibroseis" prospecting. Vibroseis prospecting employs a land or marine seismic vibrator as the energy source. In contrast to an impulsive energy source, a seismic vibrator imparts a signal into the earth having a much lower energy level, but for a considerably longer period of time.

The seismic signal generated by a seismic vibrator is a controlled wavetrain (i.e., a sweep) which is applied to the surface of the earth or in the body of water. Typically, a sweep is a sinusoidal vibration of continuously varying frequency, increasing or decreasing monotonically within a given frequency range, which is applied during a sweep period lasting from 2 to 20 seconds or even more. The frequency may vary linearly or nonlinearly with time. Also, the frequency may begin low and increase with time (upsweep), or it may begin high and gradually decrease (downsweep).

The seismic data recorded during vibroseis prospecting (hereinafter referred to as "vibrator data") are composite signals, each consisting of many long, reflected wavetrains superimposed upon one another. Since these composite signals are typically many times longer than the interval between reflections, it is not possible to distinguish individual reflections from the recorded signal. Thus, as is well known to persons skilled in the art, one of the first steps in processing seismic vibrator data is to cross-correlate the recorded data with the sweep signal (also known as the "reference signal"). See, e.g., Kirk, P., "Vibroseis Processing," Chapter 2 of Developments in Geophysical Exploration Methods—2, edited by A. Fitch, Applied Science Publishers Ltd., London, 1981, pp. 37-52. The resulting correlated data approximate the data that would have been recorded if the source had been an impulsive energy source.

One undesirable byproduct of the conventional cross-correlation process is the existence of excessive amounts of side lobe energy in the resulting wavelet. Recently, a new type of sweep known as a "shaped" sweep has been developed to resolve this problem. The primary benefit of a shaped sweep is that the correlated vibrator data will have a simple wavelet shape and minimal side lobe energy. This is accomplished by shaping the sweep so as to yield a specific power spectrum, as more fully described in copending U.S. patent application Ser. No. 08/086,776 filed Jul. 1, 1993.

The amount of energy injected into the earth during a conventional vibrator sweep is governed by the size of the vibrator and the duration of the sweep. Given current practical limitations on both vibrator size and sweep duration, it is usually necessary to generate several sweeps at each source point. Each sweep is typically followed by a listen period during which the vibrator is not sweeping, but reflection energy is still being received by the seismic detectors. Data resulting from each sweep are then cross-correlated with the reference signal for that sweep, and the resulting individual data traces are summed or "stacked" to obtain the final composite data trace for the source point. A significant portion of the time required for each source point is associated with the listen time between sweeps. Obviously, the efficiency of vibroseis prospecting could be significantly improved by eliminating part or all of this listen time.

Another problem with conventional vibroseis prospecting results from the fact that vibrators generate harmonic distortion as a result of non-linear effects in the vibrator hydraulics and the ground's non-linear reaction to the force exerted by the vibrator base plate, with the second, third, and fourth harmonics accounting for most of the distortion. These harmonics are present in the recorded data and lead to trains of correlated noise, known as harmonic ghosts, in the correlated data. These harmonic ghosts are particularly troublesome in the case of downsweeps where they occur after the main correlation peak (i.e., positive lag times) and, therefore, can interfere with later, hence weaker, reflections. In the case of upsweeps, harmonic ghosts are somewhat less troublesome because they precede the main correlation peak (i.e., negative lag times). Nevertheless, harmonic ghosts can cause difficulties in processing and interpreting data from upsweeps as well as from downsweeps.

In a 1972 publication, S. Sorkin described a method for removing even-numbered harmonics from correlated data. See, Sorkin, S., "A Method for Reducing the Effects of Base Plate Distortion," presented at the 1972 Pacific Coast joint meeting of the Society of Exploration Geophysicists and the American Association of Petroleum Geologists, Bakersfield, Calif., Mar. 9 and 10, 1972. Sorkin's method exploits the fact that the final composite data trace is the algebraic sum of several individual data traces. In Sorkin's method, only half of the individual data traces are generated in the conventional manner. The other half are generated with a reversed polarity sweep. During the summation or stacking process, the polarity of the data from the second group is reversed at the input of the recording system so that the second group of data traces are identical to the first group. The even-numbered harmonics, however, are unaffected by this second polarity reversal, and therefore, the stacking process causes the even-numbered harmonics from the second group of traces to cancel those of the first group.

In 1981, E. Rietsch proposed a generalization of Sorkin's method which permits elimination of harmonics of a sweep up to any desired order. See, Rietsch, E., "Reduction of Harmonic Distortion in Vibratory Source Records," Geophysical Prospecting, v. 29, pp. 178–188, 1981. Rietsch's method requires that a series of M signals be used where each signal has an initial phase angle differing from that of the previous signal by the angle $2\pi/M$. Prior to stacking, the individual data traces are correlated with their respective sweep signals. By using this method, all harmonics up to and including the Mth harmonic cancel. The (M+1)th harmonic is present in the correlated data, and the following M-1 harmonics cancel, and so on.

Other methods have also been proposed for suppressing correlation noise. In 1982, Edelmann and Werner proposed two possible methods for doing so. See, Edelmann, H. A. K. and Werner, H., "Combined Sweep Signals for Correlation Noise Suppression," Geophysical Prospecting, v. 30, pp. 786–812, 1982. Their first method, known as the "Combisweep" technique, consists of using two or more sequential conventional sweeps having different frequency ranges. Symmetric or asymmetric frequency weighting for the composite trace can be achieved by overlapping the frequency spectra of the different sweeps. Their second method, known as the "Encoded Sweep" technique, uses a number of short sweeps combined into code sequences without time gaps. Two of these code sequences, the code and the complementary code, with a listening period in between, form the final encoded sweep. These methods, however, were not intended to improve the efficiency of vibroseis prospecting, and in general were no more efficient than conventional vibrator techniques.

U.S. Pat. No. 4,823,326 issued Apr. 18, 1989, to R. M. Ward describes a seismic data acquisition technique that permits simultaneous use of two or more seismic vibrators located at different source locations. Each of the vibrators uses a sequence of at least four individual sweeps. The pilot signal for each vibrator has a plurality of separate phase angles, and the sweep sequence for each vibrator is different from that of the other vibrator(s). The recorded signals are correlated against each of the sweep sequences. This generates separate correlated records for each of the sweeps, which are then summed in the appropriate manner to separate the data originating from each source location. Ward utilizes the method of Rietsch, described above, to suppress harmonic ghosts. Ward, however, does not improve vibrator efficiency by eliminating part or all of the listen time between individual sweeps. Rather, any improvement in efficiency is due to the use of multiple vibrators.

In a 1990 paper, Ward et al. stated that concatenating sweeps with the proper phase coding would allow the elimination of the intervening listen times to enhance the efficiency of vibroseis prospecting. See, Ward, R. M., Brune, R. H., Ross, A., and Kumamoto, L. H., "Phase Encoding of Vibroseis Signals for Simultaneous Multisource Acquisition," presented at the Sixtieth Annual International Meeting & Exposition of the Society of Exploration Geophysicists, San Francisco, Calif., September 23–27, 1990. However, Ward et al. failed to note that concatenating sweeps together into a sequence produces harmonic ghosting at both negative- and positive-lag times when correlated, regardless of sweep direction. For this reason, current methods for concatenating or linking sweeps together require the use of pairs of vibrator sweep sequences in order to suppress harmonic ghosting. The sweeps in the second sequence, the complementary sequence, are phase rotated in the opposite direction from the first sequence. Further, for this technique to be effective, both sweep sequences must be vibrated at the same source point.

Obviously, a need exists for a method of concatenating or linking sweeps together so as to reduce or eliminate the unproductive listen time without requiring the use of pairs of vibrator sweep sequences in order to suppress harmonic ghosting. The present invention provides such a method.

SUMMARY OF THE INVENTION

It is therefore an object of the present invention to provide a method for cascading or linking vibrator sweeps together to form a cascaded sweep sequence.

It is another object of the invention to provide a method for improving the efficiency of vibroseis prospecting by eliminating part or all of the unproductive listen time between individual sweeps.

It is still another object of the present invention to provide a method for correlating vibrator data generated by a cascaded sweep sequence.

It is yet another object of the present invention to provide a correlation method which permits suppression of both negative- and positive-lag-time harmonic ghosts without the necessity for using pairs of vibrator sweep sequences.

It is a feature of the present invention that any type of sweep (linear or nonlinear) may be linked or cascaded into a sweep sequence using the techniques described herein.

It is another feature of the present invention that the initial phase angle of each individual sweep segment within a sweep sequence is progressively rotated by a constant phase increment of about 360/N degrees, where N is the number of sweep segments within the sweep sequence.

It is yet another feature of the present invention that either the correlation reference sequence or the vibrator sweep sequence, but not both, contains an additional sweep segment positioned and phased so as to substantially suppress harmonic ghosts during correlation.

These and other objects and features of the invention will be apparent to one skilled in the art based on the teachings set forth herein.

The present invention is a method for generating seismic data using a seismic vibrator. In a first embodiment, the inventive method comprises the steps of (a) generating a first cascaded sweep sequence consisting of N sweep segments linked end-to-end, where N is equal to or greater than 2, said N sweep segments being substantially identical, except that the initial phase angles of said N sweep segments are progressively rotated by a constant phase increment of about 360/N degrees; (b) generating a second cascaded sweep sequence consisting of (1) N consecutive sweep segments linked end-to-end, said N consecutive sweep segments corresponding to said first cascaded sweep sequence, and (2) an additional sweep segment linked to said N consecutive sweep segments, said additional sweep segment being positioned and phased so as to substantially suppress harmonic ghosts during correlation of said seismic data; (c) using one of said cascaded sweep sequences for the vibrator sweep sequence, thereby generating a seismic signal which propagates into the earth; (d) recording uncorrelated seismic data resulting from reflection of said seismic signal from subterranean geologic formations; (e) using the other of said cascaded sweep sequences for the correlation reference sequence; and (f) correlating said seismic data using said correlation reference sequence.

Any type of sweep may be used for the individual sweep segments, as long as all sweep segments within a particular sweep sequence are substantially identical, except for the progressive rotation of the initial phase angle. The additional segment, which may be located in either the correlation reference sequence or the vibrator sweep sequence, but not both, provides the proper balance for suppressing both negative- and positive-lag-time harmonic ghosts with a single vibrator sweep sequence.

BRIEF DESCRIPTION OF THE DRAWINGS

The present invention and its advantages will be better understood by referring to the following detailed description and the attached drawings in which.

Figure 1A:
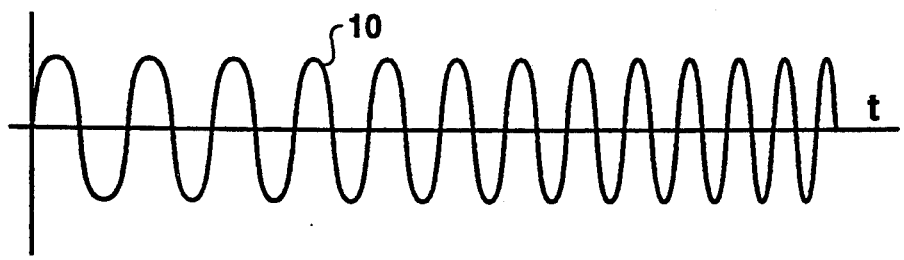
FIGS. 1A through 1D illustrate vibrator upsweeps and downsweeps having various initial phase angles.

While the invention will be described in connection with its preferred embodiments, it will be understood that the invention is not limited thereto. On the contrary, it is intended to cover all alternatives, modifications, and equivalents which may be included within the spirit and scope of the invention, as defined by the appended claims.

DETAILED DESCRIPTION Of THE PREFERRED EMBODIMENTS

The present invention is a method for cascading or linking seismic vibrator sweeps together which overcomes the above-described deficiencies of current methods. The encoding technique of the invention provides full suppression of both negative- and positive-lag-time harmonic ghosts with a single vibrator sweep sequence. Accordingly, pairs of vibrator sweep sequences are not needed for harmonic suppression. Other advantages of the invention will be readily apparent to persons skilled in the art based on the following detailed description. To the extent that the following detailed description is specific to a particular embodiment or a particular use of the invention, this is intended to be illustrative and is not to be construed as limiting the scope of the invention.

The present invention combines the benefits of using a number of short sweeps per source point (i.e., less coherent noise generation and better random noise suppression) with the increase in efficiency gained from using a fewer number of long sweeps. The cascaded-sweep sequence is formed by placing several short sweeps end-to-end to form one long sweep sequence. Each sweep within a sequence is defined as a segment, and the individual sweep segments can be joined with or without padding (listen time) in between. The individual sweep segments are typically 1–16 seconds in length, with 4–8 second lengths being preferred. The amount of padding can range from zero to the normal listen time used in conventional vibroseis prospecting. However, preferably, the sweep segments are joined without padding since this provides the most efficient operation. For example, four conventional 6-second sweeps could be replaced by one cascaded sweep sequence consisting of four 6-second sweep segments, thereby reducing the number of listen periods from four to one while maintaining the same total sweep effort (24 sweep seconds).

As is well known to persons skilled in the art, individual sweeps (or sweep segments) typically have the form:

$$S(t)=A(t)\sin(\phi(t)+\phi_i) \quad (1)$$

where A(t) represents the amplitude envelope of the sweep and is typically a window function applied to the sweep to prevent it from starting or stopping abruptly in amplitude, $\phi(t)$ is the instantaneous phase function of the sweep (the derivative of which yields the sweep's instantaneous frequency), and $\phi_i$ is a constant representing the initial phase angle of the sweep, ranging from 0 to 360 degrees. These characteristics define the sweep (or sweep segment).

According to the present invention, each sweep segment within a sequence is substantially identical (i.e., has substantially identical characteristics) except for its initial phase angle. As will be apparent to persons skilled in the art, the characteristics (other than initial phase angle) of the sweep segments within a particular sequence preferably should be as nearly identical as possible; however, minor variations in one or more of the sweep characteristics may be acceptable. The initial phase angle of each sweep segment is progressively rotated by a constant phase increment of about 360/N degrees, where N is the number of sweep segments linked together. For example, four sweep segments linked together could have initial phase angles of 0°, 90°, 180°, and 270°, respectively. It should be noted that the starting angle, which can range from 0° to 360°, is not important and in the foregoing example was arbitrarily set at 0°. Moreover, the direction of rotation may be either positive (counterclockwise) or negative (clockwise), but should be consistent throughout a particular sweep sequence. Phase-angle rotation is necessary to provide adequate harmonic noise suppression. As taught by Rietsch, a rotation through N angles will suppress the first N harmonics. Typical numbers of sweep segments in a sequence (i.e., values of N) range from three to eight, with three being somewhat of a minimum number to provide nominal harmonic noise suppression and eight being somewhat of a maximum to keep the sequence length from exceeding current equipment limitations. Of course, future advances in vibrator-instrument design may make it practical to use sweep sequences containing more than eight sweep segments. Also, the invention may be practiced with as few as two sweep segments; however, in this case only the even harmonics would be suppressed.

In order to recover the desired data, the correlation reference sequence (which is used to correlate the recorded seismic data) and the vibrator sweep sequence (which is used to generate the seismic data) must "correspond" to each other. As used herein and in the claims, two sweep sequences "correspond" if they are comprised of sweep segments which have substantially the same instantaneous phase function, $\phi(t)$, and if their initial phase angle rotations have the same direction and substantially the same increment. It is not necessary, however, for the equivalently positioned sweep segments of the two sequences to have the same amplitude envelope, A(t), or initial phase angle, $\phi_i$. Nevertheless, those skilled in the art will understand that it is clearly preferable for the correlation reference sequence and the vibrator sweep sequence to be as nearly identical as possible, as this will result in the simplest operation.

It is important to note that, unlike conventional upsweeps (which produce harmonic ghosts only at negative lag times on the correlated record) or conventional downsweeps (which produce harmonic ghosts only at positive lag times on the correlated record), cascading or linking sweeps together produces both negative- and positive-lag-time harmonic ghosts on the correlated record, regardless of sweep direction. Therefore, in addition to the phase rotation scheme discussed above, an additional sweep segment is required to provide the proper balance necessary to suppress both negative- and positive-lag-time harmonic ghosts with a single vibrator sweep sequence. As more fully described below, this additional sweep segment can be placed in either the correlation reference sequence or the vibrator sweep sequence, but not both. It is precisely this additional sweep segment that makes the present invention robust.

The invention may be utilized with any of the various types of vibrator sweeps known to persons skilled in the art (e.g., upsweeps, downsweeps, linear sweeps, nonlinear sweeps, shaped sweeps, etc.). All that is required is that each of the sweep segments within a particular sweep sequence be substantially identical, with the exception of the initial phase-angle rotation described above.

Figure 1B:
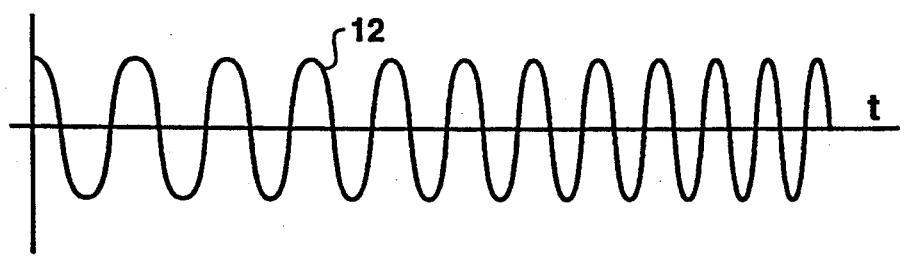
Figure 1C:
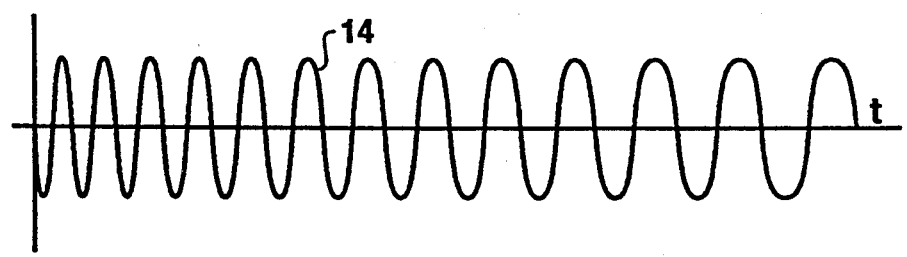
Figure 1D:
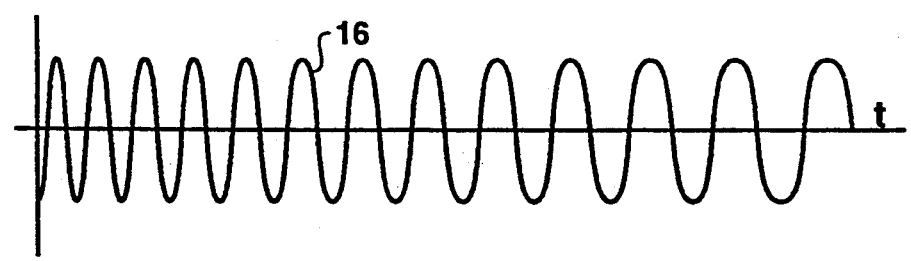

FIGS. 1A through 1D illustrate these concepts. FIG. 1A shows an upsweep 10 (i.e., beginning at a low frequency and gradually increasing) having an initial phase angle of 0°. Upsweep 10 may be either a linear or a nonlinear sweep depending on whether the frequency varies linearly or nonlinearly with respect to time. FIG. 1B illustrates an upsweep 12 having an initial phase angle of 90°. Again, upsweep 12 may be either a linear or a nonlinear sweep. FIG. 1C shows a downsweep 14 (i.e., beginning at a high frequency and gradually decreasing) having an initial phase angle of 180°, and FIG. 1D shows a downsweep 16 having an initial phase angle of 270°. As with the upsweeps 10 and 12, downsweeps 14 and 16 may be either linear or nonlinear sweeps.

Other combinations and variations will be readily apparent to persons of ordinary skill in the art. It should be noted, however, that the so-called "shaped" sweeps described above are simply a specific type of nonlinear sweep in which the frequency is varied so as to yield a desired power spectrum.

FIGS. 2A through 2D illustrate the four basic embodiments of the present invention. In each of these illustrations, the individual sweep segments are shown in block form. In each block, the segment number, the sweep direction (up or down), and the initial phase angle (IPA) are indicated. Other characteristics of the sweep segments, such as the amplitude envelope, A(t), and instantaneous phase function, $\phi(t)$, are omitted since they are discretionary with the user. As noted above, all that is required is that the individual sweep segments within a particular sequence be substantially identical, except for the progressive IPA rotation. The progressive IPA rotation may be either positive or negative as long as it remains consistent throughout the sequence. The amount of padding 18 (i.e., listen time) between the individual segments may range from zero to the normal listen time; however, as noted above, zero padding is preferred because it provides the most efficient operation.

Each of the four embodiments illustrated in FIGS. 2A through 2D includes two cascaded sweep sequences: a correlation reference sequence and a vibrator sweep sequence. The vibrator sweep sequence is used to drive the seismic vibrator, and the correlation reference sequence is used to correlate the resulting seismic data. For each embodiment, the correlation reference sequence and the vibrator sweep sequence correspond to each other except that one or the other, but not both, includes an additional sweep segment. However, as noted above, preferably the correlation reference sequence and the vibrator sweep sequence are substantially identical (except for the additional sweep segment). The location of the additional segment and its IPA are dependent on the direction of the sweep (up or down) and whether the additional segment is located in the correlation reference sequence or the vibrator sweep sequence. The function of this additional sweep segment will be described in detail below.

Figure 2A:
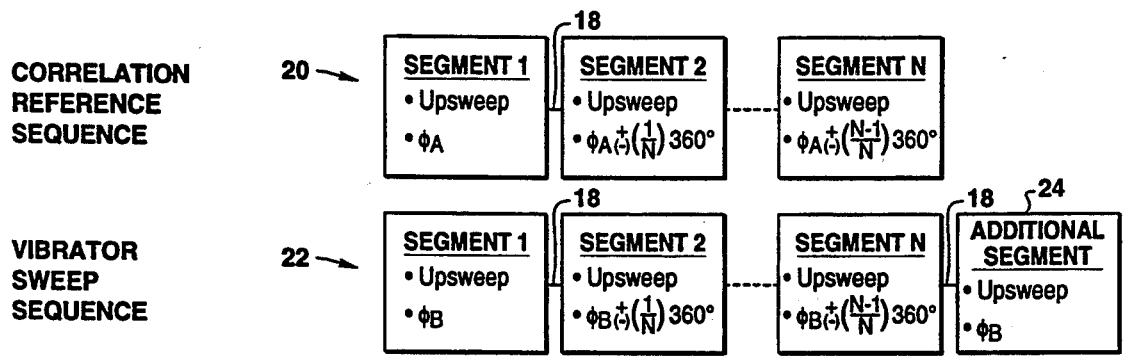
FIGS. 2A through 2D illustrate, in block diagram form, the four principal embodiments of the invention.

Turning now to the embodiment illustrated in FIG. 2A, the correlation reference sequence 20 includes N substantially identical upsweep segments. The IPA of segment 1 is arbitrarily set at $\phi_A$ (which can take any value from 0° to 360°), and the IPA of each subsequent segment is rotated by a constant increment of about 360/N degrees. Therefore, the IPA of segment 2 is $$\phi_A \underset{(-)}{+} \left(\frac{1}{N}\right)360°,$$

and the IPA of segment N is $$\phi_A \underset{(-)}{+} \left(\frac{N-1}{N}\right)360°.$$

The minus (−) sign in these expressions indicates that the rotation may be in either direction. The vibrator sweep sequence 22 includes N+1 segments, the first N of which correspond to the N segments of correlation reference sequence 20. An additional sweep segment 24 has been placed at the end of vibrator sweep sequence 22. This additional sweep segment is substantially identical to segment 1 of vibrator sweep sequence 22. Note that the initial phase angle of segment 1 of vibrator sweep sequence 22 is $\phi_B$, which may take any value from 0° to 360°. It is not necessary (only preferred) that $\phi_B$ be equal to $\phi_A$.

Figure 2B:
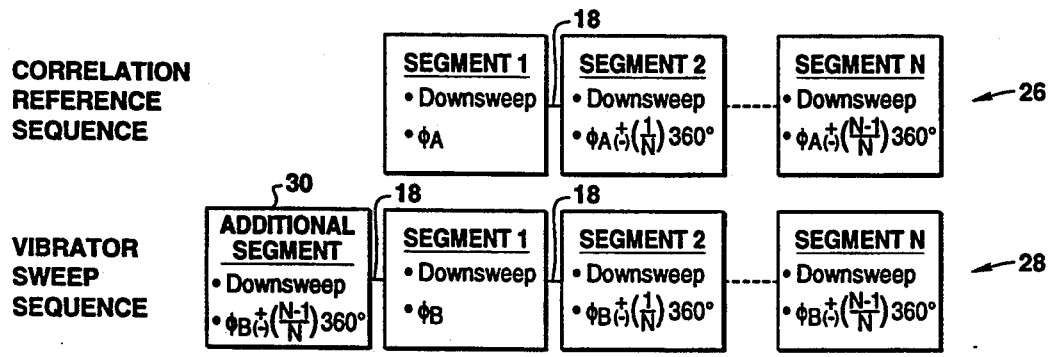

In the embodiment of the invention illustrated in FIG. 2B, the correlation reference sequence 26 includes N substantially identical downsweep segments. The IPA of segment 1 is $\phi_A$, and the IPA of each subsequent segment is rotated by a constant increment of about 360/N degrees. Again, this rotation may be in either direction provided the direction is consistent throughout the sequence. The vibrator sweep sequence 28 includes N+1 segments, the last N of which correspond to the N segments of correlation reference sequence 26. An additional sweep segment 30 has been placed at the beginning of vibrator sweep sequence 28. This additional sweep segment is substantially identical to segment N of vibrator sweep sequence 28.

Figure 2C:
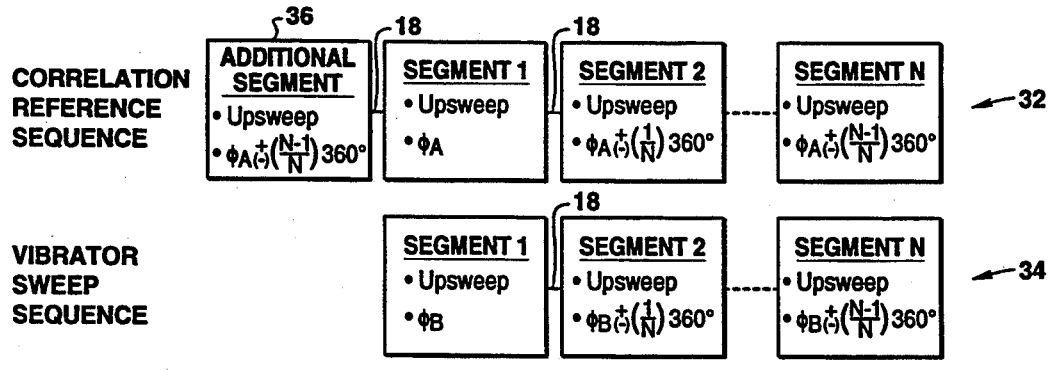
Figure 2D:
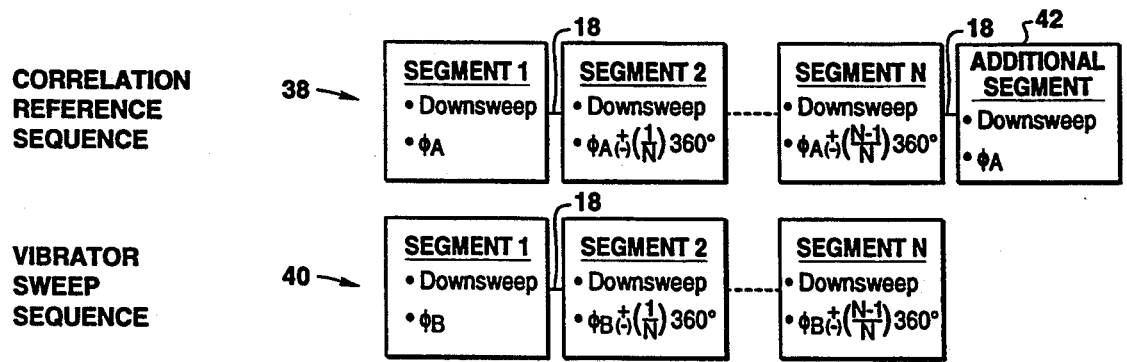

In the embodiments illustrated in FIG. 2C and 2D, the additional sweep segment is included in the correlation reference sequence rather than in the vibrator sweep sequence. In FIG. 2C, the vibrator sweep sequence 34 includes N upsweep segments having IPAs which are progressively rotated (in either direction) by a constant increment of about 360/N degrees. The correlation reference sequence 32 includes N+1 sweep segments, the last N of which correspond to the N segments of vibrator sweep sequence 34. The additional sweep segment 36 is placed at the beginning of correlation reference sequence 32 and is substantially identical to segment N of correlation reference sequence 32.

In FIG. 2D, the vibrator sweep sequence 40 includes N downsweep segments have IPAs which are progressively rotated in the same manner as the other embodiments described above. The correlation reference sequence 38 includes N+1 segments, the first N of which correspond to the N segments of vibrator sweep sequence 40. The additional sweep segment 42 is placed at the end of correlation reference sequence 38 and is substantially identical to segment 1 of correlation reference sequence 38.

The purpose of the additional sweep segment will now be explained in the context of a cascaded sweep sequence containing N upsweep segments (i.e., the embodiments illustrated in FIGS. 2A and 2C). For progressively negative correlation lag times, the increasingly higher frequencies of each correlation reference segment correlate with increasingly higher-order harmonics produced by the analogous vibrator sweep segment (i.e., the vibrator sweep segment which has the same position in the vibrator sweep sequence as the correlation reference segment has in the correlation reference sequence). This is simply the familiar negative-time harmonic ghosting present in all vibrator upsweep data. Since all N angles of rotation are present, negative-time ghosts resulting from the 2nd-Nth harmonics will be suppressed. For increasingly positive correlation lag times, however, the harmonics do not correlate between analogous sweep segments but between adjacent sweep segments. The high-frequency end of each reference segment correlates with the high-order harmonics produced by the adjacent vibrator segment first. As the correlation reference sequence moves forward in time, its lower frequencies then begin to correlate with the lower-order harmonics of the adjacent vibrator segments. Therefore, cascading or linking sweep segments together also produces positive-time harmonic ghosting that must be suppressed. (These positive-time harmonic ghosts are actually the negative-time harmonic ghosts of the adjacent sweep segment.) Suppression of these positive-time ghosts is critical since they interfere with later, hence weaker, reflection data. The additional sweep segment is therefore necessary to provide the proper balance to have all N angles of rotation present between adjacent sweep segments for positive lag times. This will suppress the positive-time ghosts resulting from the 2nd-Nth harmonics. The additional sweep segment may be placed either at the end of the vibrator sweep sequence (FIG. 2A) or at the beginning of the correlation reference sequence (FIG. 2C).

For downsweeps, however, just the opposite is true. The additional sweep segment provides the proper balance for negative correlation lag times. Therefore, for downsweeps, the additional sweep segment is placed either at the beginning of the vibrator sweep sequence (FIG. 2B) or at the end of the correlation reference sequence (FIG. 2D).

The cascaded sweep method employs long continuous data recording with a long correlation reference that has repeating segments. After correlation, this gives rise to repeating records at lag times equal to the sweep segment length. This is known as fundamental ghosting, and ghosts from subsequent record segments can interfere with the desired record segment. The present invention can be used to link any type of sweep segments together (linear or nonlinear sweep segments as well as up or down sweep directions), but fundamental-ghost contamination can be largely eliminated with a single vibrator sweep sequence by using sweep segments that exhibit low side lobe energy after correlation and with appropriate selection of the target zone such that the desired data falls within the sweep segment length. The above-referenced copending patent application describes a specific sweep type known as a shaped sweep which, unlike linear sweeps, produces simple wavelets with minimal side lobe energy after correlation. Shaped sweeps are designed to yield a specific power spectrum that is optimal for side lobe suppression; therefore, shaped sweeps are ideal candidates for linking or cascading into a sequence.

Implementation of the present invention will now be described in connection with the sweep sequences illustrated in FIG. 3, which depicts the additional sweep segment 44 in the vibrator sweep sequence 48 (e.g., the embodiment of FIG. 2A). This particular configuration could be used to replace a stack of four conventional 6-second upsweeps with a single cascaded vibrator-sweep sequence; thereby, reducing the overall listen and associated turnaround time from four listen periods to one. Preferably, shaped sweep segments are used due to their simplicity after correlation; however, it should be understood that any sweep type may be used. The correlation reference sequence 46 is comprised of cascading four substantially identical 6-second shaped sweep segments, each rotated by 90° (360/4), to form a 24-second long sweep sequence. The vibrator sweep sequence 48 is substantially identical to correlation reference sequence 46 except that it contains an additional sweep segment 44 which is placed at the end of the sequence and which is substantially identical to the first segment, thereby making the vibrator sweep sequence 30 seconds in length. Additional sweep segment 44 corresponds to vibrating throughout the listen period and provides the proper balance necessary to suppress both negative- and positive-lag-time harmonic ghosts with a single vibrator sweep sequence. It is important to note that additional sweep segment 44 can be truncated at the end of the desired listen period and does not affect the zero-lag correlation value. For instance, if 4 seconds of listen time are required, vibrator sweep sequence 48 could be truncated at 28 seconds—the minimum record length required prior to correlation.

As noted above, it is not necessary (only preferred) that, except for additional segment 44, vibrator sweep sequence 48 be substantially identical to correlation reference sequence 46. All that is required is that vibrator sweep sequence 48 correspond (as defined above) to correlation reference sequence 46.

Figure 3:
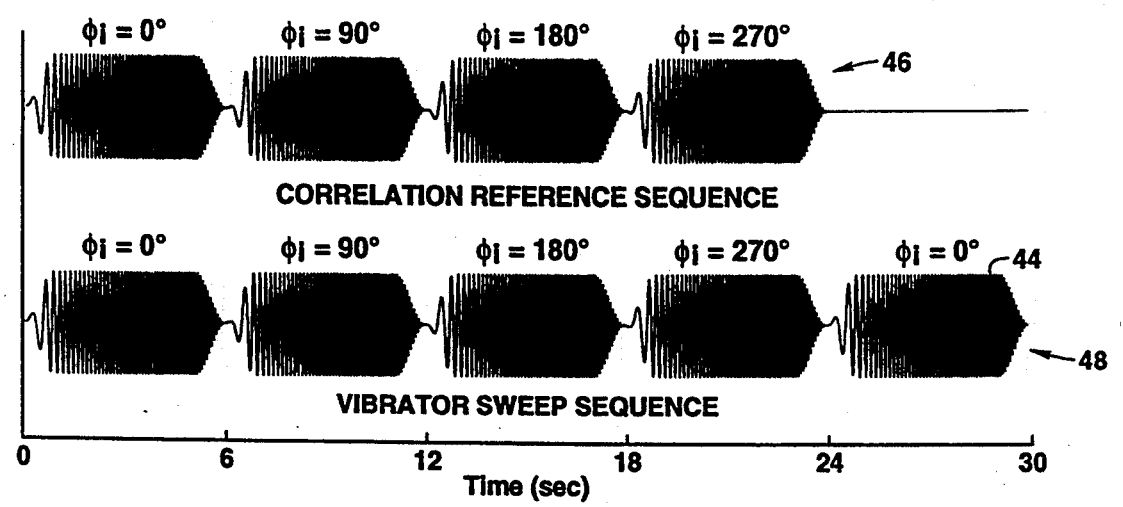
FIG. 3 illustrates the correlation reference sequence and the vibrator sweep sequence for one embodiment of the invention.
Figure 4A:
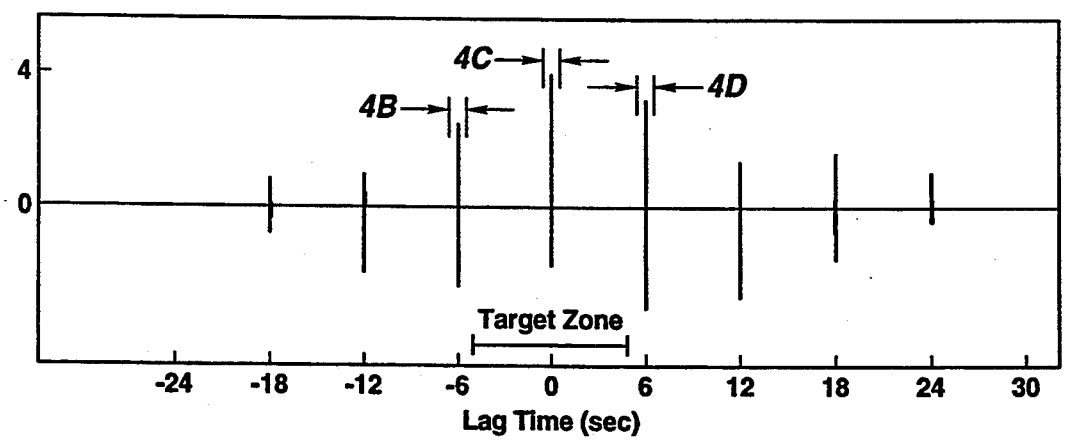
FIGS. 4A through 4D illustrate the results of cross-correlating the correlation reference sequence with the vibrator sweep sequence of FIG. 3.
Figure 4B:
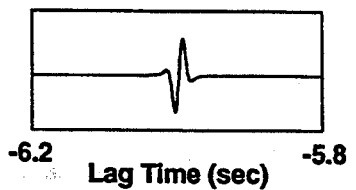
Figure 4C:
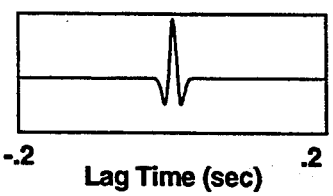
Figure 4D:
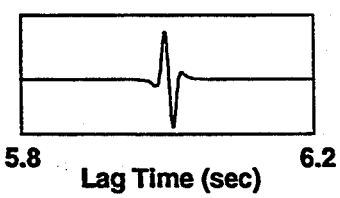

FIGS. 4A through 4D show the result of correlating the two sweep sequences illustrated in FIG. 3. FIG. 4A shows the results of the cross-correlation for correlation lag times from $-24$ sec. to $+30$ sec. FIGS. 4B, 4C, and 4D are expanded views of the correlation peaks occurring at lag times of $-6$ sec., 0 sec. and $+6$ sec., respectively. The zero-phase pulse at zero lag time (see FIG. 4C) is generated when the two sweeps are lined up exactly in time as illustrated in FIG. 3. As correlation reference sequence 46 moves backward or forward in time, a new correlation peak (see e.g., FIGS. 4B and 4D) will occur every 6 seconds when the correlation reference and vibrator sweep sequences line up again. (These are defined as the correlation frame boundaries which result in fundamental ghosting.) However, there is a progressive $\pm 90°$ phase relationship between correlation peaks because of the phase rotation between segments (i.e., $+90°$ at 6 second lag, $0°$ at 0 lag, $-90°$ at $-6$ second lag, etc.). Also, the amplitude of the correlation peaks decreases with increasing positive or negative lag times since there are fewer sweep segments correlating. The zero-lag correlation (see FIG. 4C) is effectively four times the amplitude of a single-sweep correlation; therefore, correlation of a cascaded sweep sequence provides the stacking function normally done on multiple single sweeps per source point. In the foregoing example, the signal level of the zero-lag correlation is equivalent to that of a vertical stack of four correlated single sweeps.

Shaped-sweep segments provide for extremely clean correlation frame boundaries. By positioning the desired target zone within a sweep segment length ($+6$ seconds in the foregoing example), the desired data are exactly recovered. Practically, the actual vibrator correlation wavelets will have some side lobe and residual harmonic energy. Therefore, to ensure that side lobes from the next correlation frame do not appreciably interfere with the desired target zone, the target (which is the desired correlated output record length) is typically constrained to fall within a sweep segment length minus about 1-2 seconds (e.g., $+4$–5 seconds for 6-second segment lengths). In general, about a 1-second buffer is more appropriate for sweeps having low side lobe levels such as shaped sweeps, and about a 2-second buffer is more appropriate for sweeps having higher side lobe levels such as linear sweeps. Therefore, the sweep segment length should be greater than or equal to the desired correlated output record length (typically, the listen time) plus about 1-2 seconds.

Pairs of vibrator sweep sequences per source point can be used to suppress the large correlation peaks that mark the frame boundaries. It is not necessary, however, to vibrate both sequences at precisely the same pad location since full suppression of the harmonic ghosts is self-contained within each sweep sequence, and the target is likewise constrained, as described above. By rotating the second vibrator sweep sequence (and its corresponding correlation reference sequence) in the opposite direction of that shown in FIG. 3, (i.e., $0°$, $270°$, $180°$, $90°$), a vertical stack of the correlated records from these sequences will suppress the frame boundaries occurring at $+6$ seconds. In most cases, the target zone cannot be extended across this zone because the amount of practical suppression is limited to about 24–30 dB. Therefore, the residual peak could still mask out any reflections occurring around that time. However, this technique can be used to extend the usable target zone closer to the correlation frame boundary.

One additional point about the target zone should be clarified. As stated above, the cascaded-sweep method employs long continuous data recording with a long correlation reference that has repeating segments. If there are strong, deep reflectors with two-way travel times longer than an individual sweep segment, then they will correlate with the next segment, even though it has a different initial phase angle. These events will appear on the correlated output at shallower times and degrade the desired data. For example, if the sweep segment length is 6 seconds, and the desired correlated output is 4 seconds, but a strong reflector occurs at 8 seconds, there will be an event on the correlated output at 2 seconds corresponding to the 8-second event. Therefore, the target-zone definition should include all events of significant amplitude, regardless of whether they are of interest.

A general mathematical expression for the cascaded sweep method for upsweeps where the additional sweep segment is incorporated into the vibrator sweep sequence (i.e., the embodiment of FIG. 2A), is as follows:

$$RS^\pm = \sum_{i=1}^{N} \uparrow S^{[\phi_A \pm (i-1)360/N]}_{(i-1)L, iL} \tag{2}$$

$$VS^\pm = RS^\pm + \uparrow S^{[\phi_A]}_{NL,(N+1)L} \tag{3}$$

where:

$RS^\pm$ is the correlation reference sequence, having a length which typically spans from 0 to NL seconds. The $\pm$ superscript on RS denotes that the initial phase angle of successive sweep segments may be progressively rotated in either direction. The direction of rotation is not important, but it should be consistent throughout the sequence;

$VS^\pm$ is the vibrator sweep sequence, having a length which typically spans from 0 to $(N+1)L$ seconds. This sequence is equivalent to setting the upper index limit on the summation to $N+1$. The additional sweep segment corresponds to shaking throughout the normal listen period and, if so desired, can be truncated at the end of the desired listen period;

S is the individual sweep segment to be linked or cascaded together to form the sequence, and the arrow denotes the sweep direction. The subscript of S denotes the location in time of the segment, while the superscript denotes the sweep segment's initial phase angle ($\phi_i$);

$\phi_A$ is an arbitrary starting phase which can take any value from 0 to 360 degrees and is typically set to 0 for simplicity;

L is the length of the individual sweep segment plus any padding. Padding between segments can range from 0 to the conventional listen time;

N is the number of sweep segments to be linked together, typically ranging from about 3 to about 8; and the minimum record length prior to correlation is equal to about NL plus the desired correlated output record length (which is typically the listen time) minus the sweep-segment padding length (if any).

The summation in equation 2 actually performs a concatenation of the sweep segments into the sweep sequence, and the index i denotes the sweep segment number. For downsweep sequences where the additional sweep segment is incorporated into the vibrator sweep sequence (i.e., the embodiment of FIG. 2B), the time order and the initial phase angle of the additional sweep segment changes, but the concept is identical.

Equations 2 and 3 apply to the embodiment of the invention in which the vibrator sweep sequence is substantially identical to the correlation reference sequence, except for the additional sweep segment. In the embodiment of the invention where the vibrator sweep sequence corresponds to the correlation reference sequence, equation 3 would be revised as follows:

$$VS^\pm = \sum_{i=1}^{N+1} \uparrow S'^{[\phi_B \pm (i-1)360/N]}_{(i-1)L, iL} \tag{3'}$$

where S' is the individual sweep segment to be linked or cascaded together to form the sequence and has the same instantaneous phase function as S; $\phi_B$ is an arbitrary starting phase which can take any value from 0 to 360 degrees and is not necessarily equal to $\phi_A$; and the direction of phase angle rotation (either + or −) is the same for $VS^\pm$ as for $RS^\pm$.

Figure 5:
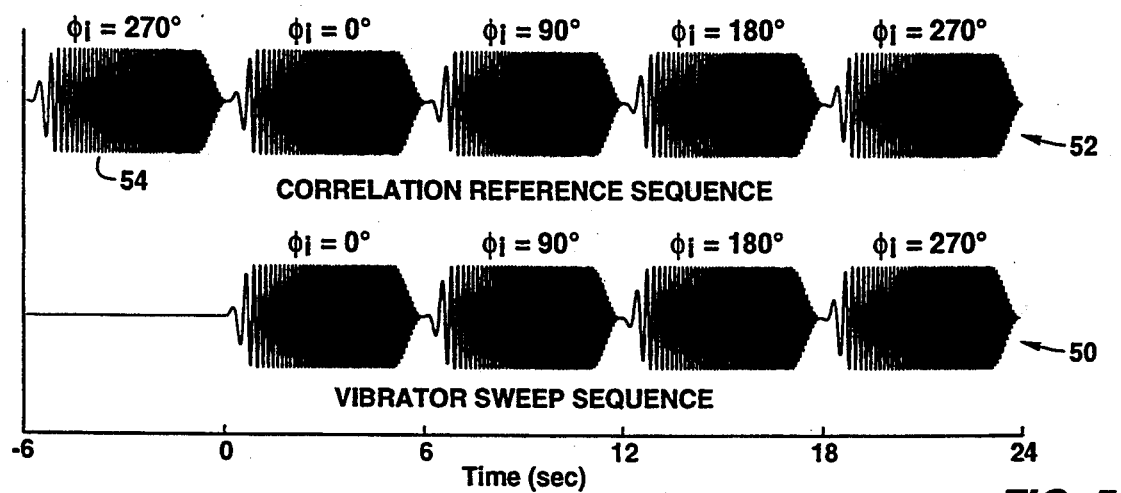
FIG. 5 illustrates the correlation reference sequence and the vibrator sweep sequence for another embodiment of the invention.

Including the additional sweep segment in the vibrator sweep sequence (i.e., embodiments illustrated in FIGS. 2A and 2B) obviously precludes vibrator move-up during the added time resulting in some loss in operating efficiency. This can be avoided by placing the additional sweep segment in the correlation reference sequence (embodiments illustrated in FIGS. 2C and 2D), thereby enabling the vibrators to move during the listen period. For example, FIG. 5 illustrates an implementation of the invention in which the vibrator sweep sequence 50 is comprised of cascading four identical 6-second upsweep segments, each rotated by 90°, to form a 24-second long sweep sequence. The correlation reference sequence 52 is substantially identical to the vibrator sweep sequence except that it contains an additional sweep segment 54 placed at the beginning of the sequence. This additional segment is substantially identical to the last segment making the total length of the correlation reference sequence 30 seconds, with the first 6 seconds occurring in minus time. It should be noted that additional sweep segment 54 can be truncated to a length equal to the desired listen time (going backwards from zero time), but there is little benefit in doing this, particularly if the time required to perform the correlation operation is unaffected. Additional sweep segment 54 does not affect the zero-lag correlation value.

Correlating the two sequences in FIG. 5 would result in a substantially identical output to that shown in FIGS. 4A through 4D (assuming that the sweep segment used in the FIG. 5 embodiment is substantially the same as the sweep segment used in the FIG. 3 embodiment). Therefore, by incorporating the additional sweep segment into the correlation reference sequence, the vibrator is free to move during the listen period resulting in the most efficient operation. It is important to note, however, that the correlation operator is non-standard (i.e., part of it is in minus time) and must be input correctly in time.

A general mathematical expression for the cascaded sweep method for upsweeps where the additional sweep segment is incorporated into the correlation reference sequence (i.e., the embodiment of FIG. 2C), is as follows:

$$VS^\pm = \sum_{i=1}^{N} \uparrow S^{[\phi_A \pm (i-1)360/N]}_{(i-1)L, iL} \tag{4}$$

$$RS^\pm = \uparrow S^{[\phi_A \pm (N-1)360/N]}_{-L, 0} \tag{5}$$

The notation is identical to that described above with respect to equations 2 and 3. The vibrator sweep sequence $VS^\pm$ has a length which typically spans from 0 to NL seconds. The correlation reference sequence $RS^\pm$ typically spans from −L to NL seconds and is equivalent to setting the lower index limit on the summation to 0. The additional sweep segment can be truncated, if desired, going backward from time 0 to the length of the listen period. For example, if the sweep segment length is 6 seconds, and the desired listen period is 4 seconds, then the additional sweep segment could be truncated at −4 seconds. For downsweep sequences where the additional sweep segment is incorporated into the correlation reference sequence (i.e., the embodiment of FIG. 2D), the time order and the initial phase angle of the additional sweep segment changes, but the concept is identical.

Equations 4 and 5 apply to the embodiment of the invention in which the correlation reference sequence is substantially identical to the vibrator sweep sequence, except for the additional sweep segment. Persons of ordinary skill in the art could easily revise equation 5 (in the same manner as described above with respect to equation 3) to cover the embodiment of the invention where the correlation reference sequence corresponds to the vibrator sweep sequence.

As noted above, pairs of vibrator sweep sequences may be used at each source point for increased noise suppression. In such case, they are preferably configured as follows (applies to all embodiments of the invention):

Sequence Set #1: Correlation reference sequence=$RS^\pm$Vibrator sweep sequence=$VS^\pm$ Sequence Set #2: Correlation reference sequence=$RS^\mp$Vibrator sweep sequence=$VS^\mp$ The reversal in the ± superscript symbol for the second sequence set indicates that if the initial phase angles of the sweep segments in the first sequence set are rotating in a counterclockwise direction, then the initial phase angles of the sweep segments in the second sequence set are rotating in a clockwise direction, and vice versa. Furthermore, although the arbitrary starting phase angle $\phi_A$ is the same for both sequence sets, this is not necessary but simply preferred.

EXAMPLES

Figure 6:
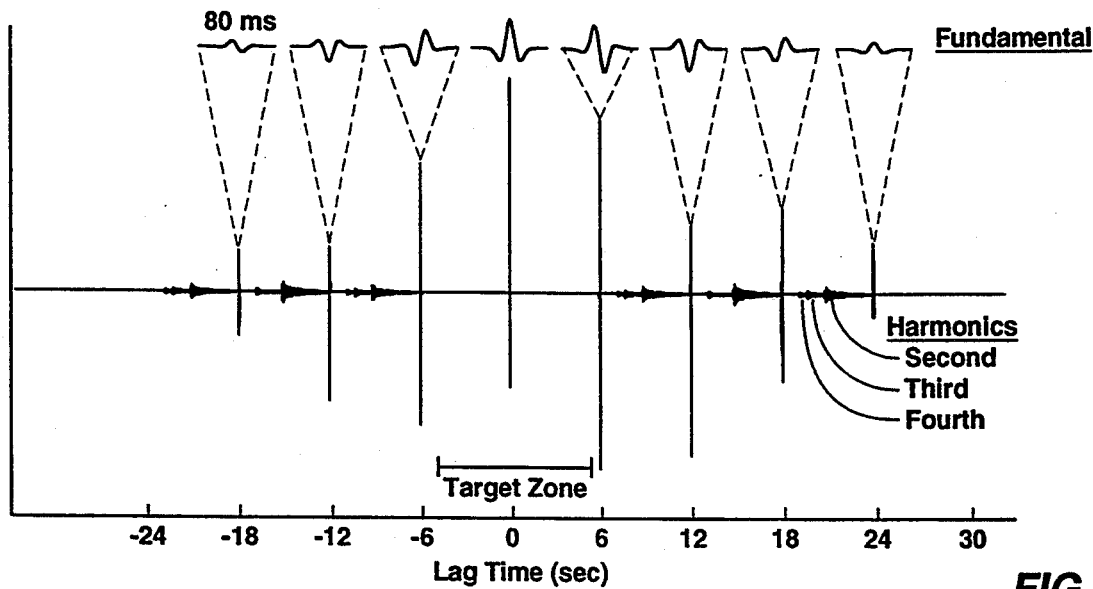
FIG. 6 shows the results of cross-correlating a simulated vibrator force sequence containing an additional sweep segment according to the invention with the corresponding correlation reference sequence.

As an example of the present invention, a synthetic vibrator-force signal was generated by summing the vibrator sweep signal 48 of FIG. 3 with the second, third, and fourth harmonics of the sweep. These harmonics account for most of the distortion present in the force output of an actual vibrator. The resulting synthetic vibrator-force sequence was cross-correlated with correlation reference sequence 46 of FIG. 3, and the result is shown in FIG. 6. An 80-millisecond expanded view of each of the main correlation peaks is also shown. Notice that full suppression of both positive- and negative-lag-time harmonic ghosts throughout the desired target zone is provided by this configuration, and the desired data are exactly recovered (compare with the target zone of FIG. 4A). Harmonic contamination only occurs outside the zone of interest.

Figure 7:
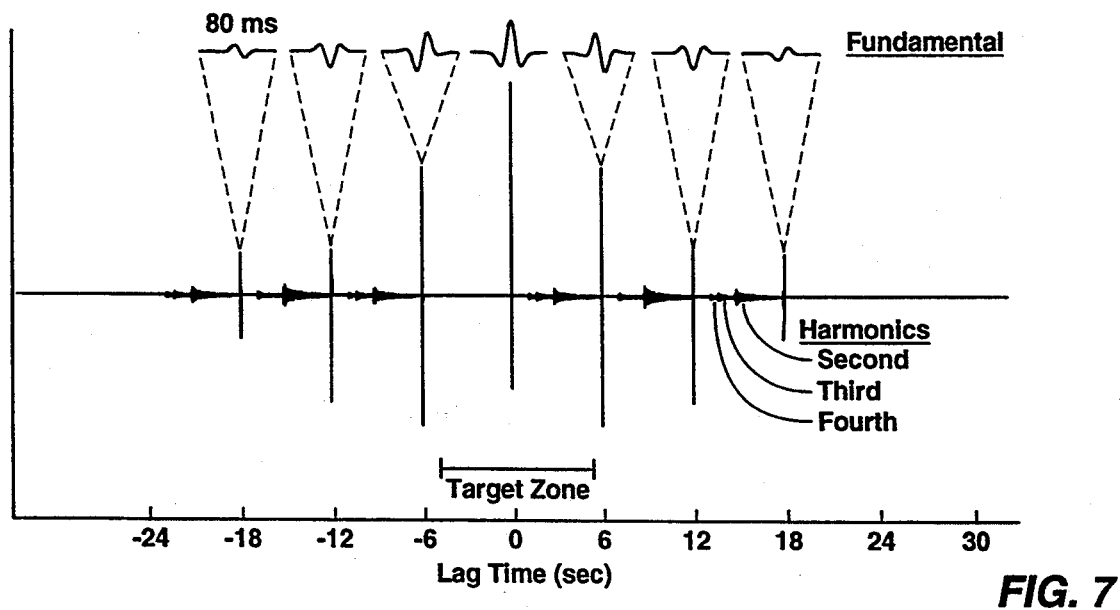
FIG. 7 shows the results of cross-correlating a simulated vibrator force sequence with the corresponding correlation reference sequence where neither sequence includes an additional sweep segment.

In contrast, FIG. 7 shows the results of cross-correlating the synthetic vibrator-force sequence described above minus the additional sweep segment with correlation reference sequence 46. (This corresponds to identical correlation reference and vibrator sweep sequences.) The result of this cross-correlation shows that the target zone is now corrupted with unacceptable levels of positive-lag-time harmonic ghosts. This type configuration is termed "unbalanced."

Figures 8A, 8B, 8C:
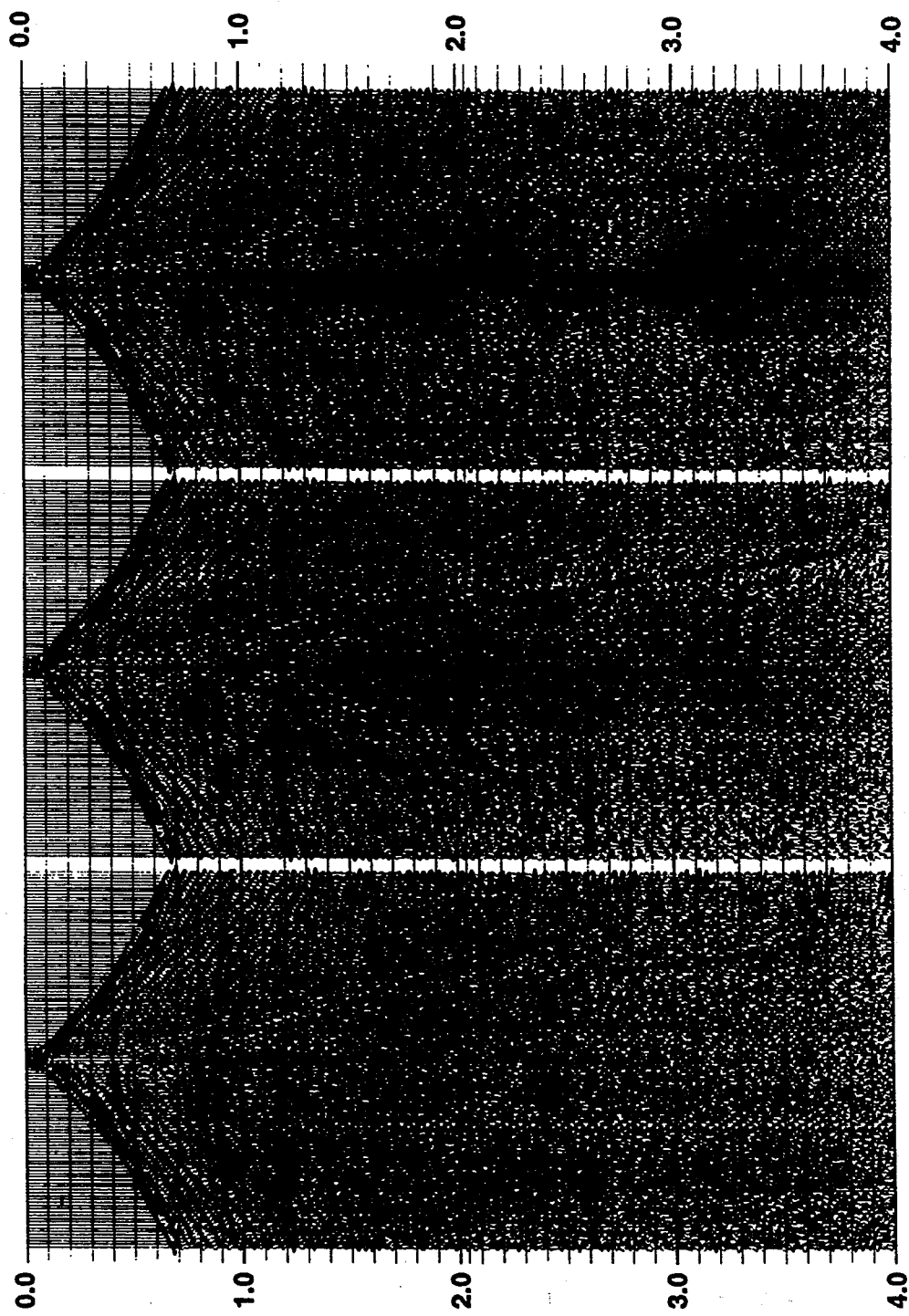
FIGS. 8A, 8B, and 8C show, respectively, comparative shot records of experimental field data for a stack of four conventional sweeps, a cascaded sweep sequence according to the invention, and an unbalanced cascaded sweep sequence (i.e., without the additional sweep segment).

FIGS. 8A, 8B, and 8C show correlated shot records of experimental field data acquired with the same vibrator at the same source point for three sweep cases: a stack of four 6-second conventional upsweeps each rotated by 90 degrees (FIG. 8A); a single cascaded vibrator-sweep sequence configured as in FIG. 3 (FIG. 8B); and an unbalanced configuration where the correlation reference sequence and vibrator sweep sequence were identical, i.e., no additional sweep segment in either one (FIG. 8C). In each case, the sweep segments and sweep effort (24 sweep seconds) were identical. Each segment or individual sweep was a 6-second shaped upsweep having a peak frequency of 36 Hz. and spanning a frequency range from 1–99 Hz. A 375-second amplitude taper was applied to each end of the segment or sweep. Notice the noise on FIG. 8C at and below 3 seconds. This is positive-lag-time harmonic ghosting resulting from the unbalanced configuration. These ghosts originate from harmonics in the direct arrivals and are associated with the adjacent sweep segment. In contrast, the method of the present invention (FIG. 8B) has greatly suppressed (~30 dB) these harmonic ghosts and is very similar in appearance and data quality to the conventional shot record (FIG. 8A). Thus, the method of the present invention reduced listen and turnaround time by approximately a factor of four with respect to conventional methods while preserving substantially the same data quality.

Persons skilled in the art will understand that the method for cascading sweeps described herein may be practiced with any type of seismic vibrator, including but not limited to land vibrators, marine vibrators, and downhole vibrators. Further, it should be understood that the invention is not to be unduly limited to the foregoing which has been set forth for illustrative purposes. Various modifications and alternatives will be apparent to those skilled in the art without departing from the true scope of the invention, as defined in the following claims.

I claim:

1. A method for generating seismic data using a seismic vibrator, comprising the steps of:
    (a) generating a first cascaded sweep sequence consisting of N sweep segments linked end-to-end, where N is equal to or greater than 2, said N sweep segments being substantially identical, except that the initial phase angles of said N sweep segments are progressively rotated by a constant phase increment of about 360/N degrees;
    (b) generating a second cascaded sweep sequence consisting of
        (i) N consecutive sweep segments linked end-to-end, said N consecutive sweep segments corresponding to said first cascaded sweep sequence, and
        (ii) an additional sweep segment linked to said N consecutive sweep segments, said additional sweep segment being positioned and phased so as to substantially suppress harmonic ghosts during correlation of said seismic data;
    (c) using one of said cascaded sweep sequences for the vibrator sweep sequence to drive said seismic vibrator, thereby generating a seismic signal which propagates into the earth;
    (d) recording uncorrelated seismic data resulting from reflection of said seismic signal from subterranean geologic formations;
    (e) using the other of said cascaded sweep sequences for the correlation reference sequence; and
    (f) correlating said seismic data using said correlation reference sequence.

2. The method of claim 1, wherein each of said sweep segments comprises a sinusoidal wavetrain having a frequency which increases with-time; said first cascaded sweep sequence is used for said correlation reference sequence; said second cascaded sweep sequence is used for said vibrator sweep sequence; and said additional sweep segment is positioned after said N consecutive sweep segments and has an initial phase angle substantially equal to the initial phase angle of the first sweep segment of said second cascaded sweep sequence.

3. The method of claim 1, wherein each of said sweep segments comprises a sinusoidal wavetrain having a frequency which decreases with time; said first cascaded sweep sequence is used for said correlation reference sequence; said second cascaded sweep sequence is used for said vibrator sweep sequence; and said additional sweep segment is positioned before said N consecutive sweep segments and has an initial phase angle substantially equal to the initial phase angle of the last sweep segment of said second cascaded sweep sequence.

4. The method of claim 1, wherein each of said sweep segments comprises a sinusoidal wavetrain having a frequency which increases with time; said first cascaded sweep sequence is used for said vibrator sweep sequence; said second cascaded sweep sequence is used for said correlation reference sequence; and said additional sweep segment is positioned before said N consecutive sweep segments and has an initial phase angle substantially equal to the initial phase angle of the last sweep segment of said second cascaded sweep sequence.

5. The method of claim 1, wherein each of said sweep segments comprises a sinusoidal wavetrain having a frequency which decreases with time; said first cascaded sweep sequence is used for said vibrator sweep sequence; said second cascaded sweep sequence is used for said correlation reference sequence; and said additional sweep segment is positioned after said N consecutive sweep segments and has an initial phase angle substantially equal to the initial phase angle of the first sweep segment of said second cascaded sweep sequence.

6. The method of claim 1, wherein said initial phase angles of said N sweep segments are progressively rotated in the counterclockwise direction.

7. The method of claim 1, wherein said initial phase angles of said N sweep segments are progressively rotated in the clockwise direction.

8. A method for generating seismic data using a seismic vibrator, comprising the steps of:
  (a) generating a first sequence set having
    (i) a first cascaded sweep sequence consisting of N sweep segments linked end-to-end, where N is equal to or greater than 2, said N sweep segments being substantially identical, except that the initial phase angles of said N sweep segments are progressively rotated by a constant phase increment of about 360/N degrees, and
    (ii) a second cascaded sweep sequence consisting of
      (A) N consecutive sweep segments linked end-to-end, said N consecutive sweep segments corresponding to said first cascaded sweep sequence, and
      (B) an additional sweep segment linked to said N consecutive sweep segments, said additional sweep segment being positioned and phased so as to substantially suppress harmonic ghosts during correlation;
  (b) generating a second sequence set having
    (i) a third cascaded sweep sequence substantially identical to said first cascaded sweep sequence, except that the initial phase angles of said third cascaded sweep sequence are rotated in the opposite direction from those of said first cascaded sweep sequence, and
    (ii) a fourth cascaded sweep sequence substantially identical to said second cascaded sweep sequence, except that the initial phase angles of said fourth cascaded sweep sequence are rotated in the opposite direction from those of said second cascaded sweep sequence;
  (c) using one of said first and second cascaded sweep sequences as a vibrator sweep sequence to drive said seismic vibrator, thereby generating a seismic signal at a preselected source location;
  (d) recording uncorrelated seismic data resulting from reflection of said seismic signal from subterranean geologic formations,
  (e) using the other of said first and second cascaded sweep sequences as a correlation reference sequence to correlate said seismic data, thereby generating a first set of correlated seismic data for said preselected source location;
  (f) using said third and fourth cascaded sweep sequences in the same manner, respectively, as said first and second cascaded sweep sequences to generate a second set of correlated seismic data for said preselected source location; and
  (g) adding said first set of correlated data to said second set of correlated data.

9. A method for generating seismic data using a seismic vibrator, comprising the steps of:
  (a) generating a correlation reference sequence consisting of N upsweep segments linked end-to-end, where N is equal to or greater than 2, said N sweep segments being substantially identical, except that the initial phase angles of said N sweep segments are progressively rotated by a constant phase increment of about 360/N degrees;
  (b) generating a vibrator sweep sequence consisting of N+1 upsweep segments linked end-to-end, wherein the first N sweep segments of said vibrator sweep sequence correspond to said correlation reference sequence and the (N+1)th sweep segment of said vibrator sweep sequence is substantially identical to the first sweep segment of said vibrator sweep sequence;
  (c) using said vibrator sweep sequence to drive said seismic vibrator, thereby generating a seismic signal which propagates into the earth;
  (d) recording uncorrelating seismic data resulting from reflection of said seismic signal from subterranean seismic reflectors; and
  (e) correlating said seismic data using said correlation reference sequence.

10. The method of claim 9, wherein each of said upsweep segments comprises a sinusoidal wavetrain having a frequency that varies linearly with time.

11. The method of claim 9, wherein each of said upsweep segments comprises a sinusoidal wavetrain having a frequency that varies nonlinearly with time.

12. The method of claim 11, wherein each of said sweep segments is shaped so as to substantially minimize side lobe correlation noise.

13. The method of claim 9, wherein each consecutive pair of sweep segments is separated by a period of time during which no signal is generated.

14. A method for generating seismic data using a seismic vibrator, comprising the steps of:
  (a) generating a correlation reference sequence consisting of N downsweep segments linked end-to-end, where N is equal to or greater than 2, said N sweep segments being substantially identical, except that the initial phase angles of said N sweep segments are progressively rotated by a constant phase increment of about 360/N degrees;
  (b) generating a vibrator sweep sequence consisting of N+1 downsweep segments linked end-to-end, wherein the last N sweep segments of said vibrator sweep sequence correspond to said correlation reference sequence and the first sweep segment of said vibrator sweep sequence is substantially identical to the last sweep segment of said vibrator sweep sequence;
  (c) using said vibrator sweep sequence to drive said seismic vibrator, thereby generating a seismic signal which propagates into the earth;
  (d) recording uncorrelating seismic data resulting from reflection of said seismic signal from subterranean seismic reflectors; and
  (e) correlating said seismic data using said correlation reference sequence.

15. The method of claim 14, wherein each of said downsweep segments comprises a sinusoidal wavetrain having a frequency that varies linearly with time.

16. The method of claim 14, wherein each of said downsweep segments comprises a sinusoidal wavetrain having a frequency that varies nonlinearly with time.

17. The method of claim 16, wherein each of said sweep segments is shaped so as to substantially minimize side lobe correlation noise.

18. The method of claim 14, wherein each consecutive pair of sweep segments is separated by a period of time during which no signal is generated.

19. A method for generating seismic data using a seismic vibrator, comprising the steps of:
   (a) generating a vibrator sweep sequence consisting of N upsweep segments linked end-to-end, where N is equal to or greater than 2, said N sweep segments being substantially identical, except that the initial phase angles of said N sweep segments are progressively rotated by a constant phase increment of about 360/N degrees;
   (b) generating a correlation reference sequence consisting of N+1 upsweep segments linked end-to-end, wherein the last N sweep segments of said correlation reference sequence correspond to said vibrator sweep sequence and the first sweep segment of said correlation reference sequence is substantially identical to the last sweep segment of said correlation reference sequence;
   (c) using said vibrator sweep sequence to drive said seismic vibrator, thereby generating a seismic signal which propagates into the earth;
   (d) recording uncorrelating seismic data resulting from reflection of said seismic signal from subterranean seismic reflectors; and
   (e) correlating said seismic data using said correlation reference sequence.

20. The method of claim 19, wherein each of said upsweep segments comprises a sinusoidal wavetrain having a frequency that varies linearly with time.

21. The method of claim 19, wherein each of said upsweep segments comprises a sinusoidal wavetrain having a frequency that varies nonlinearly with time.

22. The method of claim 21, wherein each of said sweep segments is shaped so as to substantially minimize side lobe correlation noise.

23. The method of claim 19, wherein each consecutive pair of sweep segments is separated by a period of time during which no signal is generated.

24. A method for generating seismic data using a seismic vibrator, comprising the steps of:
   (a) generating a vibrator sweep sequence consisting of N downsweep segments linked end-to-end, where N is equal to or greater than 2, said N sweep segments being substantially identical, except that the initial phase angles of said N sweep segments are progressively rotated by a constant phase increment of about 360/N degrees;
   (b) generating a correlation reference sequence consisting of N+1 downsweep segments linked end-to-end, wherein the first N sweep segments of said correlation reference sequence correspond to said vibrator sweep sequence and the (N+1)th sweep segment of said correlation reference sequence is substantially identical to the first sweep segment of said correlation reference sequence;
   (c) using said vibrator sweep sequence to drive said seismic vibrator, thereby generating a seismic signal which propagates into the earth;
   (d) recording uncorrelating seismic data resulting from reflection of said seismic signal from subterranean seismic reflectors; and
   (e) correlating said seismic data using said correlation reference sequence.

25. The method of claim 24, wherein each of said downsweep segments comprises a sinusoidal wavetrain having a frequency that varies linearly with time.

26. The method of claim 24, wherein each of said downsweep segments comprises a sinusoidal wavetrain having a frequency that varies nonlinearly with time.

27. The method of claim 26, wherein each of said sweep segments is shaped so as to substantially minimize side lobe correlation noise.

28. The method of claim 24, wherein each consecutive pair of sweep segments is separated by a period of time during which no signal is generated.

* * * * *

UNITED STATES PATENT AND TRADEMARK OFFICE
CERTIFICATE OF CORRECTION

PATENT NO.   : 5,410,517
DATED        : April 25, 1995
INVENTOR(S)  : Kenneth D. Andersen It is certified that error appears in the above-identified patent and that said Letters Patent is hereby corrected as shown below:

Cover sheet:  The filing date for application no. 242,751 should be "May 13, 1994".

Column 14, line 29:  Equation (5) should read $$RS^{\pm} = \uparrow S_{-L,0}^{[\phi_A \pm (N-1)360/N]} + VS^{\pm}$$

Signed and Sealed this

Twenty-fifth Day of July, 1995

Attest:

BRUCE LEHMAN

*Attesting Officer*          *Commissioner of Patents and Trademarks*